United States Patent [19]

Tateno

[11] 4,308,220
[45] Dec. 29, 1981

[54] TAMPERPROOF PROTECTING CONSTRUCTION

[75] Inventor: Hidenori Tateno, Aichi, Japan

[73] Assignee: Toyota Jidosha Kogyo Kabushiki Kaisha, Tokyo, Japan

[21] Appl. No.: 159,132

[22] Filed: Jun. 13, 1980

[30] Foreign Application Priority Data

Jun. 13, 1979 [JP] Japan .............................. 54/81189[U]

[51] Int. Cl.³ ............................................. F02M 3/08
[52] U.S. Cl. .......................... 261/41 D; 261/DIG. 38;
137/71; 137/382; 137/384; 220/284
[58] Field of Search ................ 220/260, 284; 215/215,
215/296; 137/382, 382.5, 384, 71; 261/41 D, 65,
DIG. 38

[56] References Cited

U.S. PATENT DOCUMENTS 3,633,787  1/1972  Katz ...................................... 220/284
4,234,523  11/1980  Onuki et al. ...................... 261/41 D Primary Examiner—George T. Hall
Attorney, Agent, or Firm—Stevens, Davis, Miller & Mosher

[57] ABSTRACT

A construction for protecting a member, such as an adjusting screw or fixing bolt, fitted to a base, from being tampered with, including a wall formed generally in the shape of a hollow tube, attached by one of its ends to the base, and surrounding the member to be protected, and a plug inserted into the other end of the wall so as to be wedged into it, with a slot being formed in the wall, extending along the axial direction of the wall from the end of the wall remote from the base, to a slot bottom at an axial position between the free end of the wall and the base, the slot bottom being closer to the base than is the part of the plug which is closest to the base, so that a gap is left between the bottom of the slot and the bottom wall of the plug for a removing tool to be inserted to lever the plug out of the end of the wall.

4 Claims, 6 Drawing Figures

TAMPERPROOF PROTECTING CONSTRUCTION

BACKGROUND OF THE INVENTION

The present invention relates to a tamperproof protective construction for sealing an adjusting member, such as an adjusting screw, or a fitting member, such as a fixing bolt, in order to prevent such a member from being tampered with or interfered with by an unauthorized person. This construction may be applied to an automobile, or the like.

In many machines which are intended to be operated by users who are not qualified to service them, such as automobiles or the like, there are provided adjustment members, such as adjusting screws, which are correctly set to their correct adjustment during manufacture of the machine, but which may subsequently require to be adjusted after variations in the operational characteristics of the machine after a lengthy period of operation thereof. For example, in an automobile, the carburetor or the distributor is typically provided with such adjusting screws. However, a problem has arisen, in that often unauthorized adjustment of such an adjusting member is performed by an unqualified or incompetent person. In such a case, the adjusting member may be adjusted to an improper setting, which may cause malfunctioning of the device to which it is fitted. For example, if a carburetor adjusting screw is improperly interfered with by an unauthorized mechanic, the fuel economy of an automobile to which the carburetor is fitted may be deteriorated, and, further, the exhaust emissions of the automobile may be rendered more noxious, and their content of harmful pollutants may be drastically increased. Further, in an extreme case, the automobile may even not start properly, especially from the cold condition.

A further problem has arisen with regard to certain components of automobiles and other machines, in that, although they are required, by law, to be fitted when the machine is being produced in the factory, some unprincipled users may desire to dispense with these parts, contrary to law. For example, in an automobile, an exhaust gas recirculation system, or a catalytic converter, may be intentionally removed by a user of the automobile, in order to increase its fuel economy, its power output performance, or its drivability. This, of course, will greatly deteriorate the quality of the exhaust emissions of the automobile, and accordingly undesirable pollution of the environment will be caused. This has become a serious problem in some areas of the United States.

A similar problem with automobiles has arisen with regard to the provision of narrow and restricted orifices for introducing fuel into the fuel tank. Modern automobiles are designed to be operated with lead free gasoline, and, accordingly, the orifice to the fuel tank of a modern automobile is made rather restricted, so as to cooperate with the small delivery nozzle of a lead free gasoline dispensing pump. A normal pump for dispensing leaded gasoline, on the other hand, has a large delivery nozzle which cannot be suitably cooperated with such a narrow fuel tank orifice in order to provide fuel to the fuel tank of such a vehicle. Thereby, it is ensured that leaded gasoline can not be provided to the fuel tank of a vehicle designed to operate on lead free gasoline, and this ensures that the catalytic converter fitted to such a modern automobile should not be poisoned by the action of lead contained in leaded gasoline. This poisoning occurs quickly, if leaded gasoline is supplied to such a vehicle, even in a small amount. However, in order to improve the performance of such an automobile designed to operate on lead free gasoline, many automobile owners have made a practice of converting the narrow orifices of their fuel tanks of their automobiles into larger orifices, by removing, in an unauthorized and illegal fashion, the fuel feed pipe to the fuel tank of their automobile, and by replacing it with a fuel feed pipe of larger size. Thereby, legal regulations have been circumvented.

SUMMARY OF THE INVENTION

As a method for protecting against such unauthorized adjustment of an adjusting member or unauthorized detachment of a fixing member as outlined above, it might be proposed to surround such an adjusting member or fixing member by a tubular surrounding wall, mounted to the body to which said adjusting member or fixing member is fitted, and to fit in the free end of this tubular surrounding wall, remote from said body, a sealing plug, so that the adjusting member of fixing member should be securely and properly sealed within a closed chamber provided by this tubular surrounding wall and this sealing plug, and so that it should be completely prevented for an unauthorized person to obtain access to this adjusting member or sealing member. As a matter of course, according to its function, such a sealing plug should be wedged fairly firmly into the free end of such a tubular surrounding wall, so as not to be easily removable therefrom by an unauthorized user.

This construction would meet with some success, but, on the other hand, there would remain some problems. It might probably occur, during the life of the machine to which the adjusting member or fixing member was provided, that authorized adjustment or removal of this member might be necessary, for example, at a garage, repair shop, or at the factory. For example, a carburetor might need to be adjusted by a qualified person, in order to improve its performance, or an exhaust gas recirculation system or catalytic converter might need to be changed or replenished with catalyst, or the like. If it were not possible to remove such a sealing plug as outlined above from its tubular surrounding wall, so as to access the adjusting member or sealing member covered thereby, then a serious inconvenience would occur during the maintenance of the automobile. This would be quite intolerable in practice.

Therefore, an object of the present invention is to provide a tamperproof protective construction, which will protect an adjusting member or fixing member from being interfered with by an unauthorized mechanic or other person, and which therefore is not easily removable using the ordinary tools to be found in a garage or machine shop, but which, nevertheless, may be easily removed at a repair facility or other machine shop which is provided with a special tool for the dismantling of such a tamperproof protective construction.

A further object of the present invention is to provide such a tamperproof protective construction as outlined above, which may be accessed from either of two approximately diametrically opposed directions.

A further object of the present invention is to provide such a tamperproof protective construction in which, if a sealing plug becomes undesirably too strongly wedged within the open end of its cylindrical wall, it may be removed reliably by a repetitive rocking action of a special tool provided for the purpose.

A further object of the present invention is to provide such a tamperproof protective construction which is cheap, simple, and easy to manufacture.

A yet further object of the present invention is to provide such a tamperproof protective construction in which ingress of dirt, oil, moisture, and the like, to the member which is to be protected from tampering are impeded.

Such objects, and others, according to the present invention, are achieved by a tamperproof protective construction for isolating a member from tampering, said member being proximate to a base, comprising a wall formed generally in the shape of a hollow tube, fixedly attached by one of its ends to said base, and surrounding said member, and a plug inserted into the other end of said wall remote from said base so as to be wedged therein, a slot being formed in said wall extending along the axial direction thereof from said other end of said wall remote from said base to a slot bottom at an axial position between said other end of said wall and said base, said slot bottom being closer to said base than is the part of said plug which is closest to said base.

Since, according to the present invention, as described above, such a sealing plug cannot easily be removed from its cylindrical wall, without the use of a special tool, which can pass in between the part of the sealing plug closest to said base, and the bottom of said slot, and which then may be manoeuvred so as to press the part of said sealing plug closest to said base away from said base, and since said special tool is not easily available to members of the public or to unauthorized mechanics, in practice such a sealing structure will not be easily dismantled except by a properly authorized or appointed person, and, accordingly, improper adjustment or interference with the adjusting or fixing member will be positively prevented. Thus a normal user of an automobile, for example, who will find difficulty in obtaining such a special tool, will not be able to remove such parts of an exhaust gas purification system as outlined above, or such a gasoline tank filler pipe, nor will he be able to adjust his carburetor or distributor, in an unauthorized or illegal fashion, if the adjusting or fixing members of the relevant parts are provided with a tamperproof protective construction according to the present invention. Thereby, maintenance of the quality of the exhaust gases of an internal combustion engine is positively aided.

BRIEF DESCRIPTION OF THE DRAWINGS

The present invention will become more fully understood from the following description of some preferred embodiments thereof, which is to be taken in conjunction with the accompanying drawings. It should be clearly understood, however, that the description of the embodiments, and the drawings, are all of them provided purely for the purposes of illustration and exemplification only, and are in no way to be taken as limitative of the scope of the present invention. In the drawings.

DESCRIPTION OF THE PREFERRED EMBODIMENTS

Figure 1:
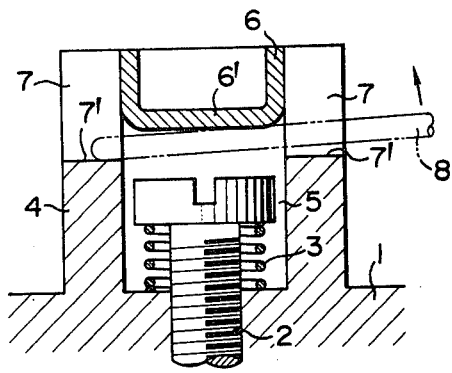
FIG. 1 is a sectional view taken vertically through a first embodiment of the tamperproof protective construction according to the present invention, which is used for protecting from tampering an adjusting screw, in which the end of a removing tool is brought to bear on the bottom of a slot in a side wall.

A first preferred embodiment of the present invention will now be described, with reference to FIGS. 1 and 2.

In the drawings, an adjusting screw member 2 is screwed into a base body 1, which is a part of a carburetor body, or the like. Between the slotted head of the adjusting screw member 2, and the base body 1, there is provided a compression coil spring 3, for preventing vibration or the like from screwing the adjusting screw member 2 in and out of the base body 1 undesirably, by providing a frictional force which opposes the turning of said adjusting screw member 2.

According to the present invention, surrounding the adjusting screw member 2 there is formed a tubular protective wall 4, which projects in the axial direction of the adjusting screw member 2 from the base body 1. Thus, this tubular protective wall 4 houses the exposed portion of the adjusting screw member 2 in its inner protective chamber 5. An anti tamper protective plug 6, which is shaped in the form of a short cylinder with one end wall, i.e. like a cup, is fitted into the upper end in the drawings of the tubular protective wall 4, and is wedged therein by being pushed thereinto with a considerable amount of pressure. In fact, the outer size of the anti tamper protective plug 6 in its unstressed state is slightly larger than the inner size of the upper end in the drawings of the tubular protective wall 4. Thus, the anti tamper protective plug 6 is wedged into the open end of the tubular protective wall 4, thereby preventing, in cooperation with the surrounding tubular protective wall 4, the adjusting screw member 2 from being accessed for adjustment.

Down from the upper end of the tubular protective wall 4 there are cut two axial slots 7, which are generally diametrically opposite to one another, at an angle of 180° apart around the circumference of the tubular protective wall 4. As clearly shown in FIG. 1, each of the axial slots 7 is formed, from the free end of the tubular protective wall 4, remote from the base body 1, down to a slot bottom 7' which is located, as seen in the drawing, below the inner end portion 6' of the anti tamper protective plug 6, which said anti tamper protective plug 6 is pressed downwards in the tubular protective wall 4 so that its upper end is flush with the upper end of said tubular protective wall 4. Thus, in this position, a vertical clearance exists between the slot bottoms 7' and the inner end portion 6' of the anti tamper protective plug 6.

Figure 2:
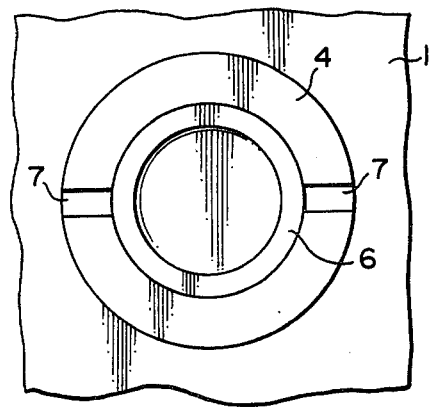
FIG. 2 is a plan view of the first embodiment of the present invention shown in FIG. 1.

The arrangement of the axial slot 7 as cut into the tubular protective wall 4 may be more clearly seen in FIG. 2.

In FIG. 1 there is diagrammatically illustrated the method for removal of the anti tamper protective plug 6 from the tubular protective wall 4. Because the anti tamper protective plug 6 is pressed into the tubular protective wall 4 with a fairly considerable amount of pressing force, and is wedged firmly therein, the anti tamper protective plug 6 cannot easily be removed from the tubular protective wall 4 by hand. Therefore, unauthorized removal of the anti tamper protective plug 6 from the tubular protective wall 4, with a view to unauthorized or illegal tampering with the adjustment of the adjusting screw member 2, is effectively prevented.

However, when legitimate removal of the anti tamper protective plug 6 from the tubular protective wall 4 is desired, as in a workshop, factory, or other authorized place, then it is necessary to use a special removing tool 8, which is shaped like a rod or a flat bar, and is of appropriate width and height to be passed through the axial slot 7 and pass over the head of the adjusting screw member 2, between the slot bottoms 7' and the inner end portion 6' of the anti tamper protective plug 6, through the above mentioned axial clearances therebetween. Thus, as shown in FIG. 1, the special removing tool 8 is passed from the right hand side in the drawings through the aforesaid clearance between the right hand slot bottom 7' and the right hand edge of the right hand inner end portion 6', and across to the left hand side of the tubular protective wall 4, so that the end of the special removing tool 8 rests upon the left hand slot bottom 7'. Thus, if the right hand end of the special removing tool 8, (which is not shown in the drawing), is pulled upwards with a certain amount of pulling force, in the direction shown by an arrow in the figure, then the right hand side in the drawing of the part of the special removing tool 8 which is within the inner protective chamber 5 of the tubular protective wall 4 will be brought against the right hand edge in the figure of the inner end portion 6' of the anti tamper protective plug 6, and thereby the anti tamper protective plug 6 will be impelled upwards with a substantial force, due to the lever action produced by the special removing tool 8, according to the ratio of the total length of the special removing tool 8, to the width of the inner protective chamber 5 of the tubular protective wall 4. Thereby, the anti tamper protective plug 6 may be easily and certainly removed from the tubular protective wall 4, provided that an operator has availability of the special removing tool 8.

With this first embodiment which is provided with two axial slots 7, an advantage arises with respect to ease of removal of the anti tamper protective plug 6 from the tubular protective wall 4. That is to say, if it is found that it is difficult to remove the anti tamper protective plug 6 from the tubular protective wall 4 by the above explained procedure of raising the right hand end in the drawing of the special removing tool 8 so as to exert upwards pressure on the right hand edge of the inner end portion 6' of the anti tamper protective plug 6, then, as an alternative, it is possible to apply a somewhat differently acting force on the anti tamper protective plug 6, by pushing down the right hand end of the special removing tool 8 in a direction opposite to that of the arrow in the Figure, so that an intermediate portion of the special removing tool 8 engages with the right hand slot bottom 7', and pivots therearound, so that the extreme left hand end in the drawing of the special removing tool 8 moves out of contact with the left hand slot bottom 7', and is raised so that it contacts the underneath of the left hand edge of the inner end portion 6' of the anti tamper protective plug 6, and applies upward force thereto. By a lever action, therefore, corresponding to the ratio of the distance from the intermediate portion of the special removing tool 8 which engages with the right hand slot bottom 7', to the right hand end of the special removing tool 8, to the distance between said intermediate portion of the special removing tool 8, and the left hand end thereof, the anti tamper protective plug 6 is pushed upwards so as to dislodge it from the tubular protective wall 4. This alternative method of removal may be particulary helpful if the anti tamper protective plug 6 becomes somewhat turned sideways in the inner surface of the tubular protective wall 4, so that the anti tamper protective plug 6 becomes jammed in the tubular protective wall 4. By an alternate pushing upwards and pushing downwards of the right hand end of the special removing tool 8, alternately the left hand and the right hand edges of the inner end portion 6' of the anti tamper protective plug 6 may be impelled upwards, thereby breaking any jamming of the anti tamper protective plug 6 and the tubular protective wall 4 which may have occurred, and positively and effectively removing the anti tamper protective plug 6 from the tubular protective wall 4.

However, if an operator is not provided with such a special tool as the special removing tool 8, for inserting through the axial slot 7, between the slot bottom 7' and the edge of the inner end portion 6' of the anti tamper protective plug 6, it will in fact be very difficult for such an operator to remove the anti tamper protective plug 6 from the tubular protective wall 4, since there is no easily accessible part of the anti tamper protective plug 6 which can be grasped, in order to pull the anti tamper protective plug 6 out from the tubular protective wall 4. Thus, unauthorized or illegal removal of the anti tamper protective plug 6 from the tubular protective wall 4 is effectively and positively prevented.

Figure 3:
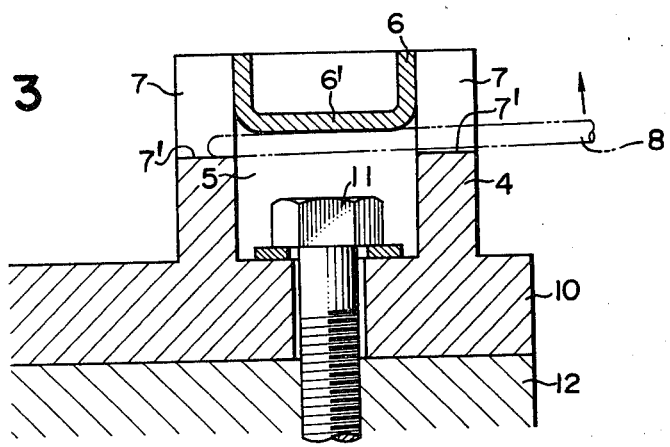
FIG. 3 is a vertical sectional view, similar to FIG. 1, showing a second embodiment of the tamperproof protective construction according to the present invention, used for protecting a fixing bolt, and in which the end of a removing tool is brought to bear on the bottom of a slot in a side wall.

In FIG. 3, there is shown a second embodiment of the tamperproof protective construction according to the present invention, which in this case is applied to the protection from tampering of a fixing bolt, instead of an adjusting screw. In FIG. 3, parts which correspond to parts in the first embodiment of FIGS. 1 and 2 are designated by the same reference numerals as in FIGS. 1 and 2.

In FIG. 3, a fixing screw member 11 is provided in a position where it clamps together an attached member 10 and a base frame member 12. In this case, it is desired to protect against unauthorized or illegal removal of the fixing screw member 11, which may be performed so as to separate the attached member 10 from the base frame member 12. To the attached member 10 there is provided a tubular protective wall 4, as in the previous embodiment, surrounding the fixing screw member 11. This tubular protective wall 4 contains within it the exposed portion of the fixing screw member 11, in an inner protective chamber 5. In the tubular protective wall 4, as in the previous embodiment, there are formed two axial slots 7, similar to the ones in FIGS. 1 and 2. Plugged into the upper end of the tubular protective wall 4 there is a anti tamper protective plug 6, which is pressed thereinto with a certain considerable amount of pressing force, so that it is snugly wedged therein. Thus, this anti tamper protective plug 6, in cooperation with the tubular protective wall 4, seals in the fixing screw member 11 and prevents it from being tampered with by unauthorized persons.

In this embodiment, as in the previously described first embodiment, the removal of the anti tamper protective plug 6 from the tubular protective wall 4 is performed by the use of a special removing tool 8. If an operator is provided with this special removing tool 8, the anti tamper protective plug 6 may be easily and reliably removed from the tubular protective wall 4; but, on the other hand, if an unauthorized operator is not provided with such a special removing tool 8, then it is very difficult for him to remove the anti tamper protective plug 6 from the tubular protective wall 4 in an unauthorized fashion.

In this embodiment, as in the previous embodiment, an advantageous method of removal of the anti tamper protective plug 6 from the tubular protective wall 4 may be to alternately raise and lower the right hand end in the drawings of the special removing tool 8, so as, by a so-called rocking action, to impel upwards alternately the left hand side and the right hand side in the drawings of the inner end portion 6' of the anti tamper protective plug 6, so as positively and reliably to remove the anti tamper protective plug 6 from the tubular protective wall 4.

An advantage of both the first embodiment shown in FIGS. 1 and 2 and the second embodiment shown in FIG. 3 is that they are symmetrical with respect to the central axis of the tubular protective wall 4. This has an advantage in that the special removing tool 8 may be inserted through either of the axial slots 7 to engage with the slot bottom 7' of the opposite axial slot 7. This has an advantage, in that the special removing tool 8 may therefore be approached to the tamperproof protective construction as a whole from either of two diametrically opposed directions, and this feature may be very useful in an application where space and accessibility to the tamperproof protective construction is restricted, as in an automobile. In some processes of disassembly, it may be required to obtain access to the tamperproof protective construction from either of two alternative directions; and further, this form of construction has special advantages for a mechanic who prefers to use his left hand. A normal right handed person may wish to access the tamperproof protective construction from one side, whereas a left handed person may prefer to approach it from the other side. Thus, the embodiments shown above have the advantage that they can be approached from either side.

Figure 4:
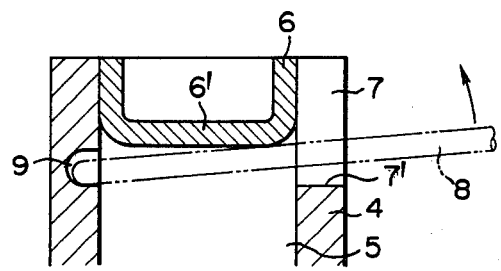
FIG. 4 is a partial vertical sectional view, similar to a part of FIGS. 1 and 3, showing the essential parts of a third embodiment of the tamperproof protective construction according to the present invention, which is used for protecting an adjusting screw or a fixing bolt, and in which the end of a removing tool is brought to bear in a hole in a side wall.
Figure 5:
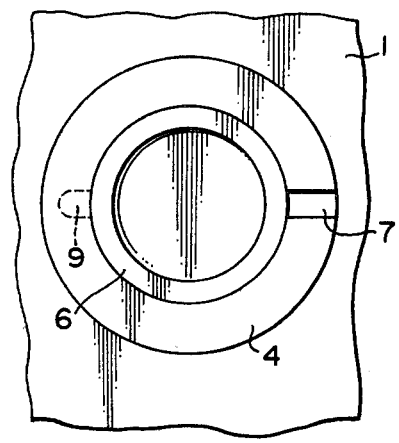
FIG. 5 is a plan view, similar to FIG. 2, of the second embodiment of the tamperproof protective construction according to the present invention, shown in FIG. 4.

In FIGS. 4 and 5 there is shown a third embodiment of the tamperproof protective construction according to the present invention. In these figures, also, like reference numerals to the reference numerals used in FIGS. 1, 2, and 3 denote like parts. The axially right hand side in these figures of this third embodiment is the same as that of the first embodiment shown in FIGS. 1 and 2, but the left hand side is different. That is to say, on the right hand side in the drawings of the tubular protective wall 4 there is provided, as before, an axial slot 7 with a slot bottom 7', and a clearance is available between the inner end portion 6' of the anti tamper protective plug 6 and the slot bottom 7', as before. However, on the left hand side in the drawing, there is provided no axial slot 7, but instead there is provided a tool engaging indentation 9 opposing the axial slot 7, at 180° around the inner surface of the tubular protective wall 4 from the axial slot 7, and at an axial position which is slightly below the bottom of the inner end portion 6' of the anti tamper protective plug 6. This tool engaging indentation 9 is formed as a part hole in the inner surface of the tubular protective wall 4, which is pierced a certain distance thereinto, but not so deep as to emerge from the outer surface of the anti tamper protective plug 6.

The method of removal of the anti tamper protective plug 6 from the tubular protective wall 4, in this embodiment, by an authorized mechanic, using a special removing tool 8, is as follows. The left hand end in the drawings of the special removing tool 8 is approached to the axial slot 7, and is inserted through the clearance between the inner end portion 6' of the anti tamper protective plug 6 and the slot bottom 7', and is then further pushed to the left in the drawing, into the inner protective chamber 5, until it reaches and engages into the tool engaging indentation 9, so as to seat on the lower lip or step thereof. Then the right hand end of the special removing tool 8 (not shown) is moved in the upwards direction in the drawing, i.e. in the direction of the arrow, and thereby pressure is applied to the right hand edge of the inner end portion 6' of the anti tamper protective plug 6, so as to impel the anti tamper protective plug 6 to be forced out of the tubular protective wall 4, by a lever action, according to the ratio of the total length of the special removing tool 8, to the distance across the inner protective chamber 5 of the tubular protective wall 4.

Thus, in this embodiment also, if an unauthorized or incompetent operator wishes to remove the anti tamper protective plug 6 from the tubular protective wall 4, so as to interfere with the adjusting member or fixing member in the inner protective chamber 5, he will find it very difficult to do so, because he will presumably not be provided with or have access to such a special removing tool 8. On the other hand, an authorized and competent mechanic in a repair shop or at the factory will be able quickly and easily to remove the anti tamper protective plug 6 from the tubular protective wall 4, by using the special removing tool 8, as described above.

This embodiment of the tamperproof protective construction according to the present invention has the advantage that, since the tool engaging indentation 9 is inside the inner protective chamber 5 of the tubular protective wall 4, and cannot be seen by an unauthorized operator, he will not know of the existence of the tool engaging indentation 9, and accordingly may well not think of the idea of using any expedient which can utilize the indentation 9 to remove the anti tamper protective plug 6 from the tubular protective wall 4. Further, the cross sectional shape of the tool engaging indentation 9 may be made square, cross shaped, or of some special shape, to cooperate with the similarly shaped end of a special removing tool 8. This provides a further additional degree of security to the tamperproof protective construction.

Figure 6:
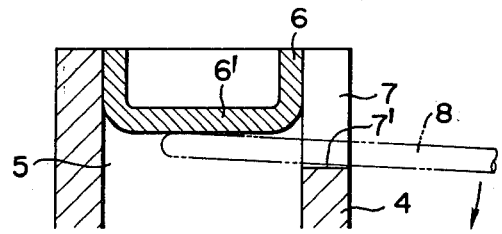
FIG. 6 is a partial vertical sectional view, similar to FIG. 4, showing the essential portions of a third embodiment of the tamperproof protective construction according to the present invention, in which the end of a removing tool is directly brought to bear on the underneath of a protective plug.

In FIG. 6, which is a part sectional view similar to FIG. 4, a fourth embodiment of the tamperproof protective construction according to the present invention is shown. In this fourth embodiment, only one axial slot 7 is provided, on the right hand side of the tubular protective wall 4 in the drawing, and the axially opposing inner surface of the tubular protective wall 4 to the axial slot 7 is formed substantially smooth. The method of removal of the anti tamper protective plug 6 from the tubular protective wall 4 in this embodiment is different from the other described embodiments, in that the left hand end in the figure of the special removing tool 8 is brought to bear directly on the inner end portion 6' of the anti tamper protective plug 6, and the right hand end of the special removing tool 8 is pressed downwards in the figure, in the direction of the arrow, by hand. Thus, an upward force is exerted on the inner end portion 6' of the anti tamper protective plug 6 so as to impel the anti tamper protective plug 6 upwards in the figure, so as to remove it from the tubular protective wall 4, with a lever action according to the ratio of the distance from the intermediate point of the special removing tool 8 which is engaged to the slot bottom 7' of the right hand axial slot 7 to the left hand end of the special removing tool 8, to the distance from said intermediate point of the special removing tool 8, to the right hand end thereof (not shown).

This embodiment has the advantage that it is easy and convenient to apply pressure to the center of the anti tamper protective plug 6, rather than to either of its edges, and, accordingly, jamming of the anti tamper protective plug 6 during its removal from the tubular protective wall 4 is rendered less likely. Further, this embodiment has the advantages of simplicity of construction, as compared to the other three previously described embodiments, in that only one axial slot 7, and no engaging construction such as the tool engaging indentation 9 on the diametrically opposite inner wall of the tubular protective wall 4, or the other axial slot 7, need be provided.

In this embodiment, also, since presumably no special tool such as the special removing tool 8 is available to an unauthorized or illegal operator, he will find it very difficult to remove the anti tamper protective plug 6 from the tubular protective wall 4. Thereby, a proper tamperproof construction is assured, which effectively protects an adjusting screw or fixing screw or the like against unauthorized or illegal interference.

Although the anti tamper protective plug 6 has been shown in the above embodiments as formed in the shape of a cup or a short cylinder with one bottom wall, the present invention is not limited to this form of plug. Therefore, although the present invention has been shown and described in terms of some preferred embodiments thereof, and in language more or less specific with regard to structural features thereof, and with reference to the illustrative drawings, it should be understood that in any particular embodiment of the present invention various changes, modifications, and omissions of the form and the detail thereof can be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiments, or of the drawings.

I claim:

1. A construction for protecting a member such as an adjusting member or fixing member from tampering, said member being proximate to a base, comprising:
   a wall formed generally in the shape of a hollow tube having a cylindrical bore, fixedly attached by one of its ends to said base, and surrounding said member;
   a cup-like plug inserted into said cylindrical bore from the end of said wall remote from said base so as to be wedged therein having a cylindrical side wall tightly contacting the wall surface of said cylindrical bore;
   a pair of slots formed in the wall of said cylindrical bore at positions diametrically opposed to one another, each said slot extending along the axial direction thereof from said end remote from said base to a slot bottom at an axial position between said other end of said wall and said base, said slot bottom being closer to said base than is the part of said plug which is closest to said base.

2. A construction for protecting a member such as an adjusting member or fixing member from tampering, said member being proximate to a base, comprising:
   a wall formed generally in the shape of a hollow tube having a cylindrical bore, fixedly attached by one of its ends to said base, and surrounding said member;
   a cup-like plug inserted into said cylindrical bore from the end of said wall remote from said base so as to be wedged therein having a cylindrical side wall tightly contacting the wall surface of said cylindrical bore;
   means for facilitating removal of said plug by a tool comprising a slot formed in said tubular wall for insertion of said tool under said plug, said slot extending along the axial direction thereof from said end remote from said base to a slot bottom at an axial position between said other end of said wall and said base, said slot bottom being closer to said base than is the part of said plug which is closest to said base; and
   means for supporting a tip of said tool on the inner surface of said tubular wall at a diametrically opposite point on said wall from said slot.

3. The construction of claim 2, wherein said means for securing a tip of said tool is a step.

4. The construction of claim 2, wherein said means for supporting said tool tip is a blind hole.

* * * * *